United States Patent [19]

Bährle et al.

[11] Patent Number: 5,016,705
[45] Date of Patent: May 21, 1991

[54] PASSENGER COMPARTMENT HEATING SYSTEM, IN PARTICULAR BUS HEATING SYSTEM

[75] Inventors: Friedrich Bährle, Kernen-Rommelshausen; Helmut Wulf, Ostfildern; Helmut Kreeb, Meersburg, all of Fed. Rep. of Germany

[73] Assignee: Daimler-Benz AG, Fed. Rep. of Germany

[21] Appl. No.: 494,561

[22] Filed: Mar. 16, 1990

[30] Foreign Application Priority Data

Mar. 18, 1989 [DE] Fed. Rep. of Germany ....... 3908994

[51] Int. Cl.⁵ .................... F28D 15/02; B60H 1/02
[52] U.S. Cl. ................................ 165/41; 165/104.14; 165/104.26; 165/104.25; 237/12.3 B
[58] Field of Search ............... 165/104.26, 104.25, 165/41, 104.14; 237/12.3 B

[56] References Cited

U.S. PATENT DOCUMENTS 4,765,396  8/1988  Seidenberg ............... 165/104.26
4,890,668  1/1990  Cima ........................ 165/104.25

FOREIGN PATENT DOCUMENTS 3002155  9/1981  Fed. Rep. of Germany.
3041710  7/1982  Fed. Rep. of Germany.
3821138  3/1989  Fed. Rep. of Germany.

OTHER PUBLICATIONS

NASA Paper TMX-1310, 1966.

Primary Examiner—Albert W. Davis, Jr.
Attorney, Agent, or Firm—Evenson, Wands, Edwards, Lenahan & McKeown

[57] ABSTRACT

The invention is a passenger compartment heating system for a bus heating system having a closed circuit through which there flows a heat transfer medium. A heat exchanger which is fed on the primary side by a heat-generating unit is used as heat-absorbing part. The inlet temperature and the heat transfer medium are matched to one another in such a way that there is a two-phase liquid/vapor mixture in the passenger heaters, which are arranged in series. The heat exchanger is designed as a capillary block or as a capillary-active porous wall into which the heat is fed on the primary side. The porous wall furthermore divides the vapor-only side from the liquid-only side of the closed circuit of the passenger compartment heating system and, in this region, has virtually only capillary-active channels.

16 Claims, 1 Drawing Sheet

PASSENGER COMPARTMENT HEATING SYSTEM, IN PARTICULAR BUS HEATING SYSTEM

BACKGROUND AND SUMMARY OF THE INVENTION

The invention relates to a closed heating circuit useful for bus vehicles wherein a liquid heating medium in a liquid state is heated and passes through passenger heaters in a liquid vapor state such that the heat exchange takes place isothermally.

A passenger compartment heating system for a bus heating system with a closed circuit and heaters arranged in series is known in automotive heating technology (DE-OS 30 41 710). In order to reduce the energy requirement of heating systems of this kind, DE-OS 30 02 155 proposes the attachment of heat exchangers to units generating waste heat and devices which feed this waste heat to the heating circuit. In general however, a disadvantage of all serial heater arrangements of passenger compartment heating systems and, in particular, of bus heating systems is that due to the emission of heat, the heat transfer medium cools continuously. As a result there is a different temperature in each heater. In extreme cases this can lead to the heat at different heaters and consequently at different passenger compartment areas being subject to widely different temperatures.

It is the object of the invention to further develop the passenger compartment heating system such that the temperature is virtually the same in all heat-emitting heaters. This object is achieved by having the inlet temperature and the heat transfer medium matched to one another in such a way that a two-phase mixture of the liquid and vapor phase of the heat transfer medium in a saturation vapor state is present in the heat-emitting part of the closed circuit. Here the heat absorbing exchanger operates as a vaporizer(s), is designed essentially as a porous wall or as a corresponding capillary block, and is situated so as to separate the liquid side and vapor side of the closed circuit heating system.

The porous wall or the capillary block has capillary-active channels within the closed circuit and the heat supply is fed liquid through the porous wall or the capillary block to its vapor side.

A liquid/vapor mixture of a heat transfer medium is passed through the heaters. The medium is virtually completely vaporized on the vapor side of the vaporizer. As long as the heat transfer medium is in the form of a two-phase mixture (liquid/vapor mixture), the serially arranged heaters of the heat-emitting part have virtually the same temperature at saturated vapor temperature. This is to be attributed to the change in the state of aggregation of individual volumes of the heat transfer medium. The heat radiated by the heaters is produced by the latent heat stored in the vapor which is released in a virtually isothermal process upon condensation of the vapor.

It is advantageous if the capillary-active channels have an inside diameter in the range between 0.5 and 140 mm and if the shape of at least one surface region of the porous wall or of the capillary block is matched to the corresponding part of the surface of the heat generating unit. Also a part of the heat generating unit which touches the vapor-side surface of the porous wall or of the caPillary block (at least in certain areas) is desirably manufactured from thermally conductive material. At its contact region with the vapor-side surface it defines a surface-covering open channel structure to carry away the saturated vapor phase. These individual channels are closely spaced and the cross-section of the intermediate walls between two adjoining channels end like a knife edge pointing toward the porous wall or the capillary block. In certain regions, the surface-covering channel structure has a waffle-shaped, channel-shaped or knob-shaped structure.

It is also advantageous if a buffer tank of alterable or variable volume is provided for controlled removal or refilling of the liquid heat transfer medium. The tank should be connected in the region of the liquid side of the passenger compartment heating system. Also a collecting container for the heat transfer medium condensed in the region of the vapor side should be arranged geodetically on virtually the same level as the vaporizer. The collector is connected in the region of the vapor side, between vaporizer and the first heater of the heat-emitting part of the passenger compartment heating system. A valve controlled return line leads from the collecting container to the liquid side of the passenger compartment heating system.

It is also advantageous if a controllable pump is provided in the closed circuit in the region of the liquid side of the passenger compartment heating system.

To insure proper drainage, lines connecting the heat-emitting elements of the heat-emitting part of the closed circuit should always have a clear downward gradient towards the liquid side of the passenger compartment heating system.

To insure isothermal heating, at the pressure prevailing on the vapor side of the passenger compartment heating system, the boiling temperature of the heat transfer medium must be equal to or less than the temperature of the heat-emitting unit. Ideally the heat transfer medium is a fluorocarbon.

For ease in construction, the porous wall or the capillary block can consist of heat-resistant plastic or at least contain one of polytetrafluoroethylene or polyethylene or polystyrene.

Other objects, advantages and novel features of the present invention will become apparent from the following detailed description of the invention when considered in conjunction with the accompanying drawings.

DETAILED DESCRIPTION OF THE DRAWINGS

Figure 1:
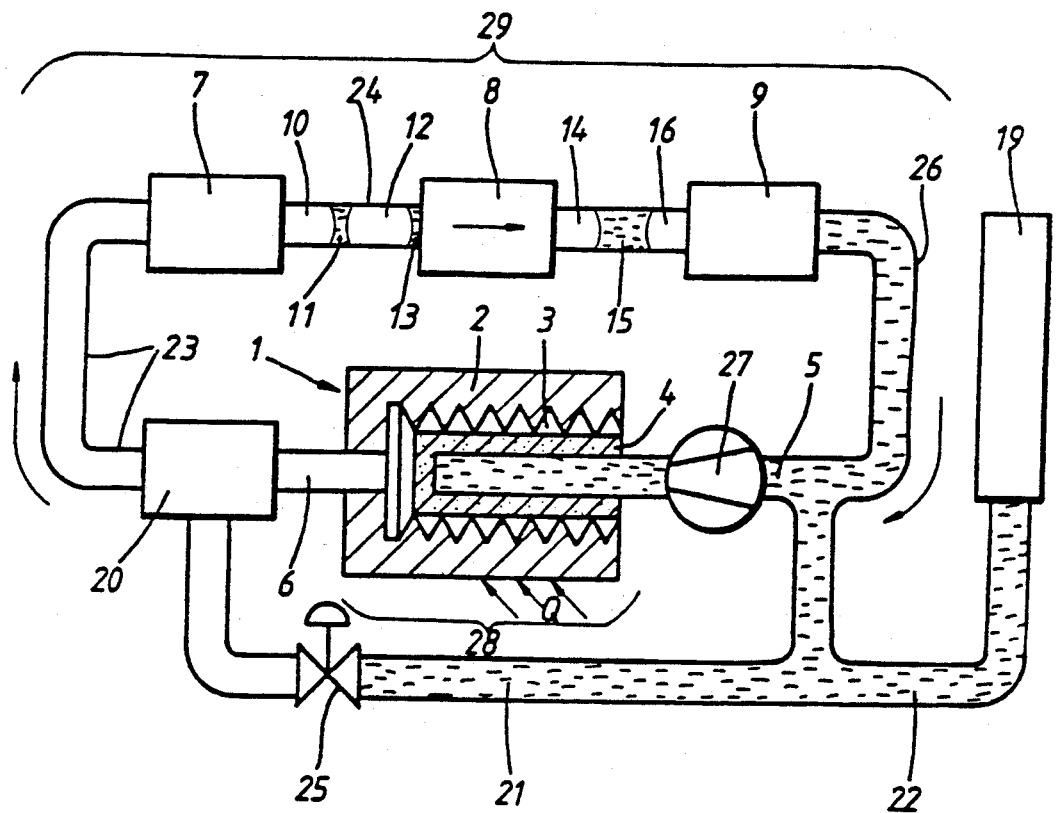
FIG. 1 shows the passenger compartment heating system in schematic representation and FIG. 2 shows part of the cross-sectional area of the evaporator.
Figure 2:
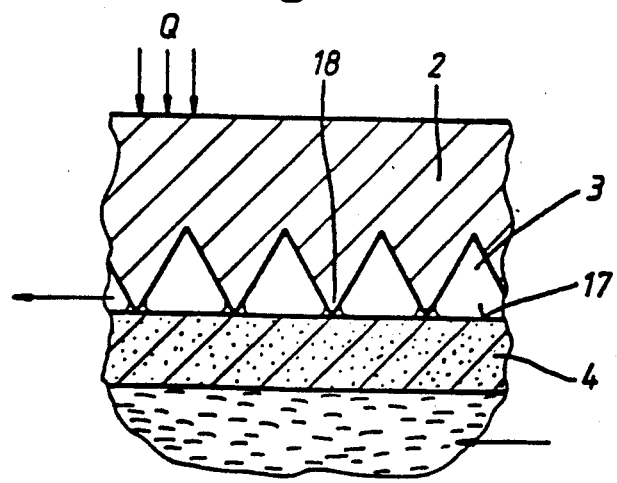

In FIG. 1, the passenger compartment heating system is divided into a heat-absorbing part 28 and a heat-emitting part 29 which together form a closed circuit having a heat transfer medium unidirectionally flowing therethrough. The heat transfer medium can be a fluorocarbon. The heat-absorbing part 28 comprises a heat exchanger operated as a vaporizer 1. The vaporizer has a porous wall 4 which divides the liquid-only side 5 from the virtually vapor-only side 6 of the closed circuit passenger compartment heating system. The further structural design of the passenger compartment heating system is located downstream of the vaporizer 1 in the direction of flow of the heat transfer medium and begins from the vapor side 6.

On the vapor side 6 of the passenger compartment heating system, the vaporizer 1 is followed by a collecting container 20 which is fitted geodetically at virtually the same height as the vaporizer 1. The collecting container 20 is provided with a return line 21 having a valve 25 for controlling and shutting off the flow therethrough. Return line 21 connects the vapor side 6 to the liquid side 5 of the passenger compartment heating system. A feed line 23 extends from the collecting container 20 to the heat-emitting part 29 of the passenger compartment heating system. The heat-emitting part 29 is formed by three heaters 7, 8, 9 arranged in series one behind the other and located in the passenger compartment to be heated. The lines 24 connecting the heaters 7, 8, 9 always have a downwardly sloping gradient towards the liquid side 5 of the passenger compartment heating system in order to ensure that any liquid component of the two-phase mixture of the heat transfer medium flowing therethrough is likewise directed towards the liquid side 5 of the passenger compartment heating system. The last heater 9 of the heat-emitting part 29 in the direction of flow, is connected to a discharge line 26 which connects the heat-emitting part 29 of the passenger compartment heating system to the liquid side 5. The liquid side 5 is connected to a buffer tank 19, the volume of which is controllable to provide for removal or feeding back of the liquid heat transfer medium.

The functional interrelationship here is as follows. The closed circuit of the passenger compartment heating system is flowed through by a heat transfer medium which is matched to the inlet temperature so that a liquid/vapor mixture of the heat transfer medium is present in each of the heaters 7, 8, 9. Since, at constant pressure, a liquid/vapor mixture always has the same temperature, the inlet temperature is virtually the same int eh case of all the serially arranged heaters 7, 8, 9 of the heat-emitting part 29.

The heat-absorbing part 28, which is designed as a vaporizer 1 with a capillary-active porous wall 4, transports liquid heat transfer medium by virtue of the capillary force to the vapor-side surface 17 of the porous wall 4. Capillary is the behavior of liquids in narrow tubes (capillaries), narrow gaps and pores. This capillarity behavior is determined by surface tension. It is based on the interaction of cohesive forces between the molecules of the liquid and the adhesive forces between the liquid and the materials surrounding it. In the sense of the application, capillary-active is to be understood to refer to the effect caused by the capillarity. Hence the transport of the heat transfer medium is based on the capillary pressure of the liquid heat transfer medium from the liquid side 5 to the vapor side 6. The porous wall 4 or capillary block thus ensures the maintenance of a pressure difference between liquid side 5 and vapor side 6 as well as permeability and transportation of the liquid heat transfer medium to the vapor side 6 of the porous wall 4 or capillary block. The porous wall 4 or capillary block can be made from a plastic such as polytetrafluoroethylene, polyethylene or polystyrene.

The vapor-side surface 17 is covered by a part 2 manufactured from thermally conductive material (sheet metal). One side of the surface of this material is matched to the form of the surface of the heat-emitting unit (not shown). The matching of this surface produces good heat transfer. Along the surface facing the porous wall, the other side of the metal sheet has a channel structure open towards the vapor side 6. The intermediate walls 18 between the channels 3 extend towards the porous wall 4 like knife edges. The channels have an inside diameter in the range of 0.5 to 140 mm. Meniscuses form at both flanks of the intermediate walls 18 in the region of the vapor-side surface 17 of the porous wall 4. By reason of the energy or heat Q made available on the primary side through the metal sheet 2 and in accordance with the vapor pressure prevailing at this temperature, the quantity of liquid required for the formation of this, vapor pressure evaporates from the free surface of the meniscuses. Due to the evaporation at the inverted meniscus of the liquid, the saturated vapor flows uniformly and possibly with slight condensate formation into the first heater 7 of the heat-emitting part 29 of the passenger compartment heating system.

The condensate formed in the feed line 23 collects in the collecting container 20 and is fed to the liquid side 5 of the passenger compartment heating system by means of the return line 21 controlled by the valve 25. In the first heater 7, the saturated vapor partially condenses, releasing the stored latent heat in a virtually isothermal process. The liquid/vapor mixture thus formed with its liquid bubbles 11, 13 and vapor bubbles 10, 12 flows through the sloping gradient line 24 connecting the heaters 7, 8, into heater 8. There the condensation process is repeated, the proportion of liquid bubbles 11, 13, 15 in the mixture thereby being increased and the proportion of vapor bubbles 10, 12, 14, 16 thereby being decreased. Given ideal matching of the various factors, inlet temperature, vapor pressure, liquid volume of the heat transfer medium, temperature of the heat-emitting unit and total volume of the closed circuit of the passenger compartment heating system, only the liquid phase of the heat transfer medium remains downstream in the direction of flow of the last heater 9 of the heat-emitting part 29. The discharge line 26 passes this liquid (completely liquid phase) to the liquid side 5 and subsequently into the vaporizer 1. The evaporation/condensation circuit is thus continuous.

To adjust the utilizable liquid quantity of the heat transfer medium, a buffer tank 19 is connected to the liquid side 5 via a line 22. This tank is expediently provided on the liquid side of the passenger compartment heating system. If, for example, there is too little vapor in the liquid/vapor mixture in the last heater 9, liquid heat transfer medium is removed on the liquid side 5, the volume of liquid in the closed circuit thereby being reduced and the quantity of liquid heat transfer medium which can be vaporized is thus increased because of the temperature-dependent saturation vapor pressure.

A further worthwhile development is the pump 27 conveying the liquid towards the vapor side 6 and arranged in the region of the liquid side 5 of the passenger compartment heating system. The pump makes it possible to counteract a pronounced sloping of the overall passenger compartment heating system and any negative effect of the hydrostatic pressure of the liquid column (for example, the discharge line 26 on the function of the porous, capillary-active wall 4).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A passenger compartment heating system having a heat-emitting part with a plurality of heaters which are arranged in series on a heat emission side of a closed heating circuit, comprising
- a heat transfer medium flowing through the closed heating circuit unidirectionally;
- a heat-absorbing part with at least one heat exchanger means to serve as a heat source; and
- a buffer tank of variable volume for controlled removal or replenishment of the heat transfer mechanism connected on a liquid side of the passenger compartment heating system;
- wherein the heat exchanger has a primary side adjacent a heat generating means;
- the heat transfer medium enters the heat-emitting part with a particular inlet temperature;
- the particular inlet temperature and the heat transfer medium are matched to one another such that a two-phase mixture of liquid and vapor of the heat transfer medium in a saturation vapor state is present in the heat-emitting part;
- the heat exchanger means is operated as vaporizer and has at least one of a porous wall and a capillary block that separates a liquid-only side and vapor side of the passenger compartment heating system from one another;
- the at least one of the porous wall and capillary block has capillary-active channels within the closed heating circuit; and
- the heat generating means on the primary side is fed with liquid through the at least one of the porous wall and the capillary block and is located on the vapor side of the latter.

2. Passenger compartment heating system according to claim 1, wherein the capillary-active channels have an inside diameter in the range between 0.5 and 140 μm.

3. Passenger compartment heating system according to claim 1 wherein a shape of at least one surface region of the at least one porous wall and capillary block is matched to a corresponding surface of the heat exchanger means adjacent the heat generating means.

4. Passenger compartment heating system according to claim 1, wherein a part of the primary side of the heat generating means touches a vapor-side surface of the at least one of the porous wall and capillary block at least in certain areas;
- wherein said part of the primary side is manufactured from thermally conductive material and contacts a vapor-side surface of the at least one of the porous wall and capillary block; and
- wherein said part of the primary side acts as a surface-covering for the capillary-active channels to carry away the saturated vapor from the heat exchanger means.

5. Passenger compartment heating system according to claim 4, wherein the individual capillary-active channels of the channel structure carrying away the saturated vapor phase are closely spaced; and
- wherein cross-sections of intermediate walls between two adjoining capillary channels end like a knife edge that points towards the at least one of the porous wall and the capillary block.

6. Passenger compartment heating system according to claim 4, wherein in at least certain regions, the surface-covering channel structure has one of a waffle-shaped, channel-shaped and knob-shaped configuration.

7. Passenger compartment heating system according to claim 5, wherein in at least certain regions, the surface-covering channel structure has one of a waffle-shaped, channel-shaped and knob-shaped configuration.

8. Passenger compartment heating system according to claim 1, wherein there is a collecting container for the heat transfer medium condensed in the vapor side;
- wherein the collecting container is arranged geodetically on virtually the same level as the vaporizer;
- and wherein the collecting chamber is connected between the vaporizer and a first heater of the heat-emitting part of the passenger compartment heating system.

9. Passenger compartment heating system according to claim 8, wherein a controllable return line leads from the collecting container to the liquid side of the closed heating circuit.

10. Passenger compartment heating system according to claim 1, wherein a pump conveys the heat transfer medium from the heat-emitting part of the passenger compartment heating system to the vaporizer; and wherein a rate of the pump is controllable.

11. Passenger compartment heating system according to claim 1, wherein the plurality of heaters of the heat-emitting part are serially connected by lines which have a clear downward gradient towards the liquid side of the closed heating circuit.

12. Passenger compartment heating system according to claim 1, wherein at a pressure prevailing on the vapor side of the heat-emitting part of the passenger compartment heating system, a boiling temperature of the heat transfer medium is at least equal to or less than the temperature of the heat-emitting unit.

13. Passenger compartment heating system according to claim 12, wherein the transfer medium is a fluorocarbon.

14. Passenger compartment heating system according to claim 1, wherein the transfer medium is a fluorocarbon.

15. Passenger compartment heating system according to claim 1, wherein the at least one of the porous wall and the capillary block consists of heat-resistant plastic.

16. Passenger compartment heating system according to claim 15, wherein the at least one of the porous wall and the capillary block include at least one of polytetraflouroethylene, polyethylene and polystyrene.

* * * * *